March 19, 1929 — E. S. VAN DE MARK — 1,706,048
SCOOTER VEHICLE
Filed Dec. 23, 1925
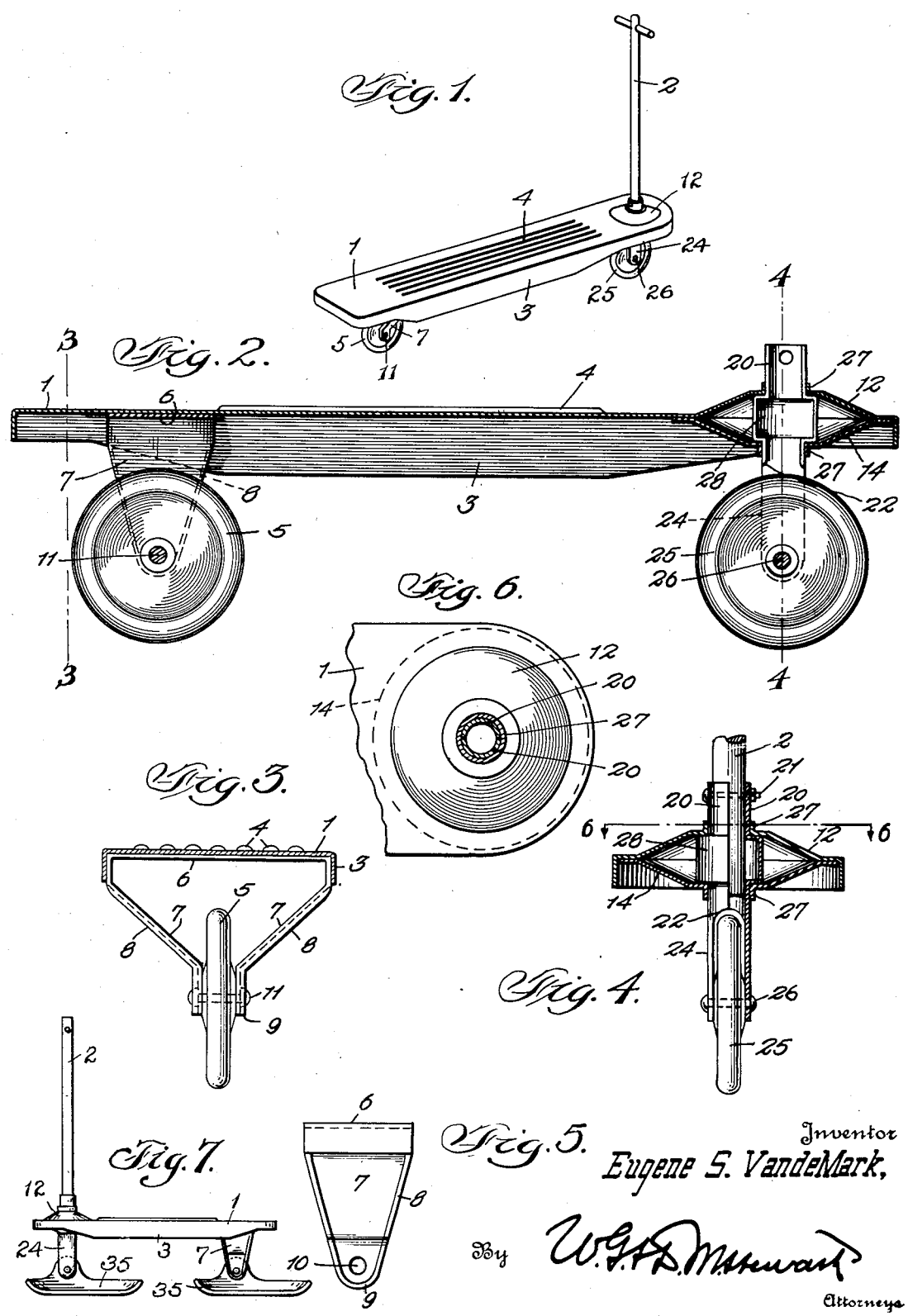
Inventor
Eugene S. VandeMark,
By W. G. F. D. Stewart
Attorneys Patented Mar. 19, 1929.

1,706,048

UNITED STATES PATENT OFFICE.

EUGENE S. VAN DE MARK, OF SPRINGMONT, PENNSYLVANIA.

SCOOTER VEHICLE.

Application filed December 23, 1925. Serial No. 77,242.

My invention relates to vehicles of the scooter type, usually a low-platformed skate-like structure upon which the occupant stands with one foot while propelling the vehicle with the other foot engaging the ground, and directs the same by means of an extended handle from the forward steering wheel or runner.

And, more particularly, my invention relates to improvements in the construction of the steering and wheel mountings and their integral connection to the vehicle platform whereby a serviceable, sturdy structure is provided with improved running qualities, and at a material reduction in the cost of production, all as more fully set forth in connection with the accompanying drawings, the novel features being set forth in the appended claim.

Fig. 1 is a perspective view of the complete device, showing a preferred embodiment.

Fig. 2 is a longitudinal vertical section of the same, shown on an enlarged scale.

Fig. 3 is a transverse vertical sectional view taken on the line 3—3 of Fig. 2, showing the rear runner mounting.

Fig. 4 is a similar view taken on the line 4—4 of Fig. 2, showing the steering column and its pivotal support of the front runner mounting.

Fig. 5 is a view in side elevation of the rear runner truck or support.

Fig. 6 is a horizontal sectional view taken on the line 6—6 of Fig. 4.

Fig. 7 shows a modification, employing runners for sliding on snow or ice.

In the preferred embodiment of the drawings, reference numeral 1 designates the platform, which is preferably constructed of sheet metal, the same as the other parts of the structure, with possibly the exception of the handle 2, though it is highly probable that metal will be selected as the material for this part also. Around its entire outer edge the platform is provided, as shown, with an integral downwardly extending flange 3, which, for added strength, may depend in a truss-like manner farther at the sides than elsewhere, as indicated in Figs. 1 and 2. The platform is further preferably reinforced by having pressed longitudinally therein a plurality of parallel reinforcing ribs 4.

The truck or support, as shown, for the rear runner or wheel 5 consists of an inverted U-shaped member, the top bar 6 of which is preferably spot welded to the under side of the platform as well as to the flange 3 thereof, thus insuring a very sturdy construction. The forks 7 of this rear truck have their side edges flanged outwardly as at 8 for further reinforcement, and these side flanges 8 are shown connected by a flange 9, the latter partially surrounding the aperture 10 in the lower end of the fork 7 which receives the end of the axle 11 on which the runner or wheel 5 is journaled. The runner or wheel 5 is prevented from wabbling by forming the lower ends of the converging forks 7 with parallel end portions between which the runner is snugly journaled, the lower ends of such forks 7 being prevented from separating by the ends of the axle pin 11 being headed over, or otherwise provided with confining enlargements.

At its forward end, the platform is provided with a conical dished portion or boss 12, preferably formed, as shown, by stamping the metal of the platform upwardly; and spot welded, or otherwise secured to the platform, is a cup-shaped sheet metal disk 14, having its outer edges for its forward half abutting the flange 3 of the forward end of the platform, so as to assist in preventing any tendency of the disk to shift and straining its connection to the platform. The edge portions of the disk 14 are in the same plane and welded to the portions of the platform surrounding and adjacent the boss 12 thereof. The cupping of this disk 14 is coincident with that of the platform portion 12, but in opposite directions whereby a space is provided between the elements 12 and 14 to provide a bearing for the front wheel steering column support. The latter, as shown, preferably is tubular, and made up of two semi-cylindrical members 20, within the upper end of which a handled steering extension 2 is secured in any desired manner, as by means of a transverse bolt 21, while the lower ends of members 20 are cut away as at 22 to provide front forks 24 between which the front runner or wheel 25 is journaled by front axle pin 26, also having headed ends. Both dishings or cuppings of the portions 12 and 14 are centrally apertured to receive the members 20 and around these apertures are flanges or rims 27 in which the members 20 are directly journaled. The members 20 adjacent their central portions are enlarged as at 28 and the ends of these enlargements form shoulders which abut the inner faces of the portions 12 and 14 to prevent any vertical play of said members.

In assembling the front wheel steering column mounting on the platform, in the preferred construction shown, the two members 20 are placed together with their upper ends passed upwardly through the central aperture in boss 12 until their shouldered enlargements 28 engage with the adjacent portion of the boss. The disk 14 is then positioned over the lower ends of the members 20 with the peripheral edge thereof welded or otherwise secured to the lower face of the platform surrounding the boss. The front steering runner or wheel 25 is then secured in position between the forked lower ends of the members 20, while the handle 2 is set into their upper ends as before described; it being understood that in place of such separate handle, the members 20 may project sufficiently to form such handle extension. Lubrication, when necessary, may be accomplished by charging oil or the like between the members 20 and the flanges 27 on the boss 12. The members 20 have their bearing supports in the flanges on boss 12 and disk 14, while the shoulders on the enlargements 28 function similarly; and to reduced friction at these bearing points, roller or ball bearings may be employed if desired.

It will be readily understood that in place of the front and rear wheels specifically shown, two wheels may be used at either or both ends, or that a runner bar may be substituted for the runner wheels, as indicated in Fig. 7, without affecting the steering construction or rear wheel mounting set forth; the term runner being employed in the claims as embracing such equivalent devices.

From the foregoing description it will be seen that a practical, inexpensive vehicle is herein provided for, simple and substantially constructed, and while there is herein shown and described the preferred embodiment of the invention, it is to be understood that changes are contemplated in certain details of construction and materials, the invention only being limited to the extent of the subject matter claimed.

What I claim is:—

In a scooter vehicle, a sheet metal platform integrally formed with a downwardly turned outer flange and an upwardly dished centrally apertured bearing half portion; a coacting reversely dished centrally apertured half bearing portion rigidly secured at its outer edges to the under side of said platform; and a steering column vertically mounted in said platform bearing apertures, said column comprising two rigidly united coacting half tube sections having an intermediate shouldered enlargement and their depending ends shaped to provide journaling forks, the flat annular shoulders of said intermediate enlargement respectively seating on the inner faces of said coacting bearing halves adjacent their apertures.

In testimony whereof I affix my signature.

EUGENE S. VAN de MARK.